4,586,784

United States Patent [19]
Tremblay et al.

[11] Patent Number: 4,586,784

[45] Date of Patent: May 6, 1986

[54] MODAL-INSENSITIVE BICONICAL TAPER COUPLERS

[75] Inventors: Yves Tremblay, Edmonton; Brian S. Kawasaki, Kanata; Francois Bilodeau, Hull, all of Canada

[73] Assignee: Canadian Patents & Dev. Limited, Ottawa, Canada

[21] Appl. No.: 774,851

[22] Filed: Sep. 9, 1985

Related U.S. Application Data

[63] Continuation of Ser. No. 503,287, Jun. 10, 1983, abandoned.

[51] Int. Cl.$^4$ .................................................. G02B 6/28
[52] U.S. Cl. .................................... 350/96.15; 350/320
[58] Field of Search ................. 350/96.15, 96.16, 320

[56] References Cited

U.S. PATENT DOCUMENTS

| | | | |
|---|---|---|---|
| 4,243,296 | 1/1981 | Aulich et al. | 350/96.15 |
| 4,291,940 | 9/1981 | Kawasaki et al. | 350/96.15 |
| 4,392,712 | 7/1983 | Ozeki | 350/96.16 |
| 4,449,781 | 5/1984 | Lightstone et al. | 350/96.15 |

*Primary Examiner*—John Lee
*Attorney, Agent, or Firm*—Edward Rymek

[57] ABSTRACT

The modal-insensitive coupler consists of a number N of optical multimode fiber lengths, each fiber length having a core of initial predetermined cross-sectional area. The fiber lengths are fused together in a coupling section such that the cores of the fiber lengths have a reduced cross-sectional area in the coupling section which supports a minimum number of modes of optical energy at a predetermined wavelength, and such that the fiber lengths have different core cross-sectional areas to produce preselected coupling ratios.

12 Claims, 8 Drawing Figures

MODAL-INSENSITIVE BICONICAL TAPER COUPLERS

This is a continuation of application Ser. No. 503,287, filed June 10, 1983, now abandoned.

BACKGROUND OF THE INVENTION

This invention is directed to biconical-taper couplers and, in particular, to multimode fiber couplers.

The fused biconical-taper coupler is described in U.S. Pat. No. 4,291,940, which issued on Sept. 29, 1981, in the name of B. S. Kawasaki, K. O. Hill and D. C. Johnson. This coupler is a widely used type of distribution element for multimode-fiber systems. This device offers the attractive combination of low excess loss, arbitrary coupling ratio, and compatibility with the fiber lines. However, for applications in which many couplers are used in combination, such as data-bus networks, this type of coupler has the drawback of being modal sensitive, that is, the coupling ratio and the excess loss vary with the mode-fill distribution of the light in the input fiber. Furthermore, the mode-fill distribution is changed as the light traverses the coupler. In a network in which several such devices are cascaded, the parameters and performance of a given device are functions of its location within the network. In order to ensure adequate received optical power at all terminals, the system designer is forced to overdesign the network for optical power budget or to build up the network piecemeal while selecting couplers.

SUMMARY OF THE INVENTION

It is therefore an object of the present invention to provide a modal-insensitive biconical-taper coupler as well as the method of making such couplers.

This and other objects are achieved in a coupler consisting of a number N of optical multimode fiber lengths, each fiber length having a core of initial predetermined cross-sectional area. The fiber lengths are fused and pulled together in a coupling section such that the cores of the fiber lengths have a reduced cross-sectional area in the coupling section that supports a minimum number of modes of optical epergy of predetermined wavelength, and such that the fiber lengths have different core crosssectional areas to produce preselected coupling ratios.

In the coupling section, the core cross-sectional areas of M of the fibers may be substantially similar, and smaller than the core cross-section areas of the remaining (N−M) fibers, where M<N. In addition, the cross-sectional areas of the fiber cores at the ports may all be identical. Further, the M may have the value of N−1 and N may further number two fibers.

The method in accordance with the present invention of producing modal insensitive couplers comprises the steps of:

(a) selecting N optical multimode fiber lengths, each fiber length having a predetermined core cross-sectional area;

(b) producing a biconical-taper region in M of the N fiber lengths where M<N;

(c) forming a bundle of the N fiber lengths with the biconical-taper regions placed adjacent;

(d) fusing the fibers along a section within the biconical-taper regions; and (e) reducing the cross-sectional area of the fiber cores within the fused section.

In a two port coupler, the values for N and M may be 2 and 1, respectively, and for most practical couplers, M would preferably be equal to N−1.

Further, in accordance with the present invention, the fusing step may include heating the fibers along the fused section, and the reducing step may include the placing of a tensile stress along the fused section while the fiber lengths are being heated. The cross-sectional areas of each of the fiber cores are reduced until they can support a minimum number of modes at a predetermined wavelength.

Many other objects and aspects of the invention will be clear from the detailed description of the drawings.

DETAILED DESCRIPTION

As described in the above mentioned U.S. Pat. No. 4,291,940, the biconical-taper couplers are made by placing two fibers together, fusing them together and pulling them to form the biconical tapers in the fibers. To control the coupling ratio of a taper coupler, the waist of the biconical taper is narrowed until the desired coupling ratio is obtained. With this method, the device is acting to pass the portion of light corresponding to low-order modes directly from the input port to a single output port while dividing the rest of the light, that corresponding to higher-order modes, approximately equally between the two output ports. This operation naturally leads to a highly modal-sensitive operation of the coupler.

Figure 2:
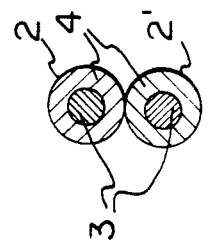

An embodiment of the coupler in accordance with the present invention will be described with reference to the schematic drawings in FIGS. 1 to 4. The coupler 1 includes two or more multimode optical fibers, each having a core 3 and a cladding 4. For clarity, only two fibers 2 and 2′ are shown. The fibers may be step-index or graded index fibers of any type which are commonly used in the industry. As shown in FIG. 2, their core cross-sectional areas may be identical.

Figure 1:
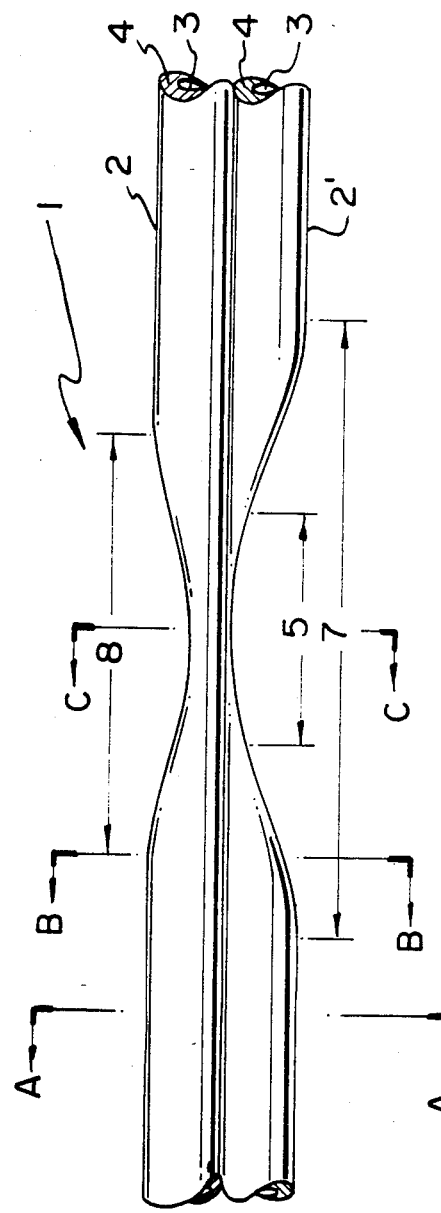
FIG. 1 illustrates a coupler in accordance with the present invention.
Figure 4:
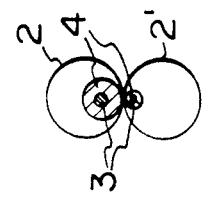
FIGS. 2, 3 and 4 are representative of the coupler cross-section taken along lines A—A, B—B and C—C respectively.

In the coupling section or fused section 5 of the coupler 1, the fibers 2, 2′, which are fused together, have core cross-sectional areas which differ. In the coupler illustrated in FIG. 1, the core cross-sectional area of fiber 2′ is smaller than that of fiber 2, as illustrated in FIG. 4. This difference in core cross-sectional areas determines the coupling ratio between fibers in the coupler. In addition, the core cross-sectional area is such that all of the light launched into a fiber 2 or 2′ escapes the core 3, i.e. the core 3 at this point is only able to support a very small number, if any, of the low-order modes for the selected wavelength of light to be transmitted.

In operation, light may be launched into either of the fibers 2, 2′; at the coupler section 5, all or most of the light will escape the core of the fiber in which it is launched, and will be converted to cladding modes. Once the core size starts increasing, the light will again be captured by the cores in a coupling ratio which will be described below.

Figure 3:
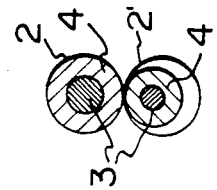

It is preferable, however, to launch the light into fiber 2 rather than fiber 2'. In constructing the coupler, fiber 2' will inherently have a longer biconical-taper region 7 than the biconical-taper region 8 of fiber 2, thus fiber 2' will start decreasing in size before fiber 2, as seen in FIG. 3. In addition, the entire taper region 7 will not be fused to fiber 2, and therefore, more losses from the fiber will occur with the light initially launched in fiber 2' rather than fiber 2.

As mentioned above, a number M of fiber lengths may be used to form a multiport coupler. In such a device, all of the fiber lengths may have identical initial core cross-sectional areas, or these areas may vary from fiber to fiber. In addition, the core cross-sectional area of the fibers in the coupling section may also differ, with the fiber with the largest core being preferably the bus into which the light is launched. The relative cross-sectional areas of the cores in the coupling section will determine the coupling ratios between the fibers. In particular, the coupling ratio to any fiber can be generally determined from the equation:

$$\% \text{ coupling to fiber } N = \frac{\text{core diameter fiber } N}{\text{sum of core diameters of fibers 1 to } N} \times 100\%$$

Thus, for a coupler having two fibers, 2, 2', the coupling ratios (CR) for the fibers will be:

$$CR \text{ for fiber } 2 = \frac{\text{core diameter of fiber 2}}{\text{core diameter of fiber 2 + core diameter of fiber 2'}}$$

$$CR \text{ for fiber } 2' = \frac{\text{core diameter of fiber 2'}}{\text{core diameter of fiber 2 + core diameter of fiber 2'}}$$

If the core diameter for fiber 2 is four times the core diameter for fiber 2', then the CR2=4D/5D=0.80, while the CR2'=D/5D=0.20.

The core of the fiber in which the light is launched has to be small enough at the coupling section so that most of the light will be converted to cladding modes. On the other hand, there is a minimum limit to the size of the core at the coupling section. The ratio of the normal diameter to the reduced diameter of the coupling section is limited by the following relationship:

$$\frac{D_2}{D_1} = \frac{NA}{(n_2^2 - 1)^{\frac{1}{2}}}; \text{ where } NA = (n_2^2 - n_1^2)^{\frac{1}{2}}$$

This relation guarantees that the light is not lost in the air at the cladding-air interface causing high losses.

When the fiber core's ratio is larger than given by the above relationship, the low order modes will not be converted to cladding modes and the coupler becomes more dependable.

Couplers having two or more input-output ports will generally be made from identical fiber core cross-sectional areas. Some of the fibers are heated and prepulled to form a biconical-taper region in each fiber. Since the coupling ratio to each fiber is determined by its relative core area in the coupling section, this coupling ratio may be preselected by prepulling some of the fibers to form the necessary tapered sections or by choosing fibers with the necessary core cross-sections in the tapered region from earlier formed fibers. The fibers are then placed together into a bundle in close contact with one another and at the same time assuring that the tapered regions of all of the fibers that have tapers are generally adjacent to one another. For a multiport coupler, the fiber which is not prepulled would preferably form the inner fiber of the bundle around the circumference of which the fibers with tapers are placed. Close contact of the fibers may be assured by twisting the bundle of fibers, particularly along the section to be fused. The bundle is then heated in the taper region of the fiber by incandescent or laser heating. With a tensile force applied along the length of the fiber bundle, the bundle will stretch and fuse to form the coupling section. In stretching, the cross-section of the bundle and thus the cores will be reduced. The tensile force is maintained until the desired core cross-sections are obtained.

Two input-output port couplers were produced in the above manner and their performance was compared to conventional two-input-output port fused couplers. The couplers were made from Corning [registered trademark] SD fiber. This multimode fiber has a nominal core diameter of 100 $\mu$m, a cladding diameter of 140 $\mu$m, and a numerical aperture of 0.3. The light launched into one input port of the couplers had a wavelength of 890 nm, and was launched into the multimode port by a 3 $\mu$m monomode fiber at up to ±50 $\mu$m from the center of the multimode fiber.

Figure 5:
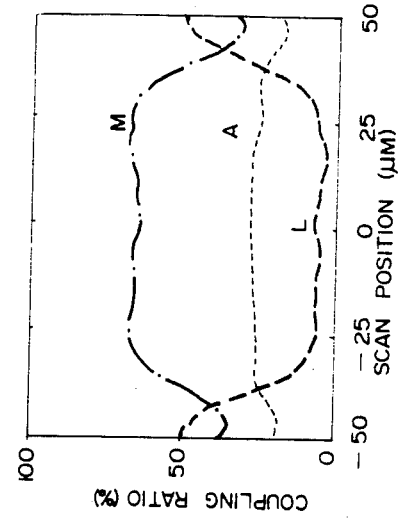
FIGS. 5 and 7 illustrate the coupling ratios for two conventional couplers.
Figure 7:
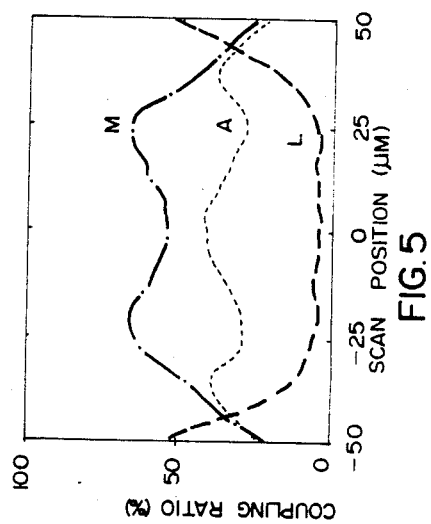

FIGS. 5 and 7 illustrate the normalized coupling ratios for the main arm M, and auxiliary arm A, and the fraction light loss for two different conventional couplers. These couplers were produced using two identical fibers as discussed above. In FIGS. 5 and 7, the coupling ratios of the arms M and A of the couplers vary substantially as the input light is launched from different positions on the fiber face. In FIG. 5, the average coupling ratio is approximately 65%:35% with a variation of 15%; in FIG. 7, the average coupling ratio is approximately 90%:10% with a variation of 10%. For the same input ranges, losses were approximately 5%.

Figure 6:
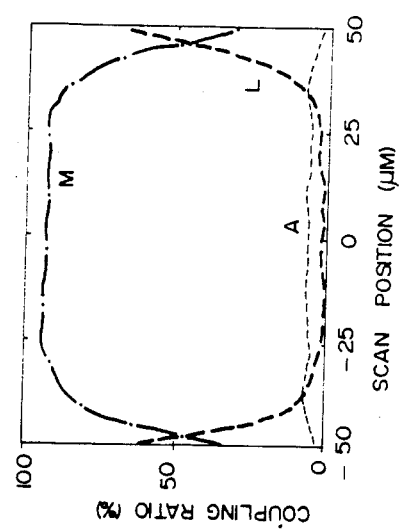
FIGS. 6 and 8 illustrate the coupling ratios for two couplers in accordance with the present invention.
Figure 8:
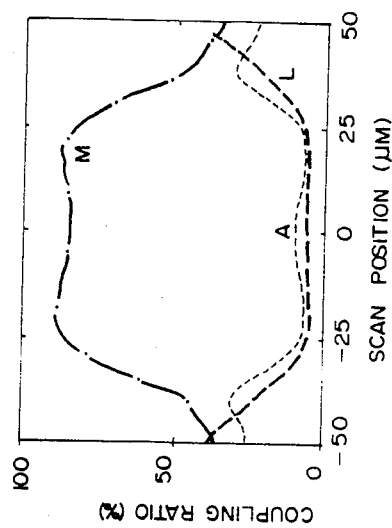

FIGS. 6 and 8 illustrate the normalized coupling ratio for a pair of couplers made in accordance with the present invention. The coupling ratios as determined by the prepulling of one of the two fibers in the coupler, were set at approximately 65%:35% and 90%:10%, respectively. However, coupling ratio variation is at a minimum as different modes are launched into the input port. It is further to be noted that losses do not increase, and in the case of the second coupler—FIG. 8, losses are minimized.

Many modifications in the above embodiments of the invention can be carried out without departing from the scope thereof and, therefore, the scope of the present invention is intended to be limited only by the appended claims.

We claim:

1. A modal-insensitive coupler comprising a number N of optical multimode fiber lengths, each fiber length having a core of initial predetermined cross-sectional area, wherein the fiber lengths are fused and tapered together in a coupling section such that the cores of the fiber lengths have a reduced cross-sectional area in the coupling section for supporting a minimum number of modes of optical energy predetermined wavelength to obtain near complete core mode to cladding mode conversion and the ratio of the tapered core diameter to the initial core diameter of M of the fibers, where $M<N$, is smaller than the ratio of the tapered core diameter to the initial core diameter of the remaining $N-M$ fibers, and such that the fiber lengths have predetermined core cross-sectional areas to produce preselected coupling ratios.

2. A modal-insensitive coupler as claimed in claim 1 wherein $M=N-1$.

3. A modal-insensitive coupler as claimed in claim 1 or 2 whrein the initial cross-sectional areas of the fiber cores are identical.

4. A modal-insensitive coupler as claimed in claim 1 wherein $N=2$ and $M=1$.

5. A method of producing a modal-insensitive coupler comprising:
   (a) selecting N optical multimode fiber lengths, each fiber length having a predetermined core cross-sectional area;
   (b) producing a biconical-taper region in M of the N fiber lengths, where $M<N$;
   (c) forming a bundle of the N fiber lengths with the biconical-taper regions being adjacent;
   (d) fusing the fibers along a section within the biconical-taper region; and
   (e) reducing the cross-sectional area of the fiber cores within the fused section such that a minimum number of modes of optical energy of predetermined wavelength can be supported to obtain near complete core mode to cladding mode conversion.

6. A method as claimed in claim 5 wherein the cross-sectional areas of the selected fiber lengths are identical.

7. A method as claimed in claim 5 wherein the fusing step includes heating the fibers along the fused section.

8. A method as claimed in claim 5, 6, or 7 wherein $N=2$ and $M=1$.

9. A method as claimed in claim 5, 6 or 7 wherein $M=N-1$.

10. A method as claimed in claim 5 wherein the reducing step includes the placing of a tensile stress along the fused section while the fiber lengths are being heated.

11. A method as claimed in claim 10 wherein $N=2$ and $M=1$.

12. A method as claimed in claim 10 wherein $M=N-1$.

* * * * *